T. D. MARSH.
Lawn-Mower.

No. 224,706. Patented Feb. 17, 1880.

UNITED STATES PATENT OFFICE.

TIMOTHY D. MARSH, OF URBANA, OHIO, ASSIGNOR OF ONE-HALF OF HIS RIGHT TO JUSTIN E. RADLEY, OF SAME PLACE.

LAWN-MOWER.

SPECIFICATION forming part of Letters Patent No. 224,706, dated February 17, 1880.

Application filed January 8, 1880.

*To all whom it may concern:*

Be it known that I, TIMOTHY D. MARSH, of Urbana, in the county of Champaign, and in the State of Ohio, have invented certain new and useful Improvements in Lawn-Mowers; and I do hereby declare that the following is a full, clear, and exact description thereof, reference being had to the accompanying drawings, and to the letters of reference marked thereon, making a part of this specification.

My invention relates to lawn-mowers, and it has for its object to make them simple in construction, strong, not liable to get out of order, and practical in their operation; and it consists in certain peculiarities of construction to accomplish these objects, as will be hereinafter more fully set forth, and pointed out in the claim.

In order to enable others skilled in the art to which my invention appertains to make and use the same, I will now proceed to describe its construction and operation, referring to the annexed drawings, in which—

Figure 1:
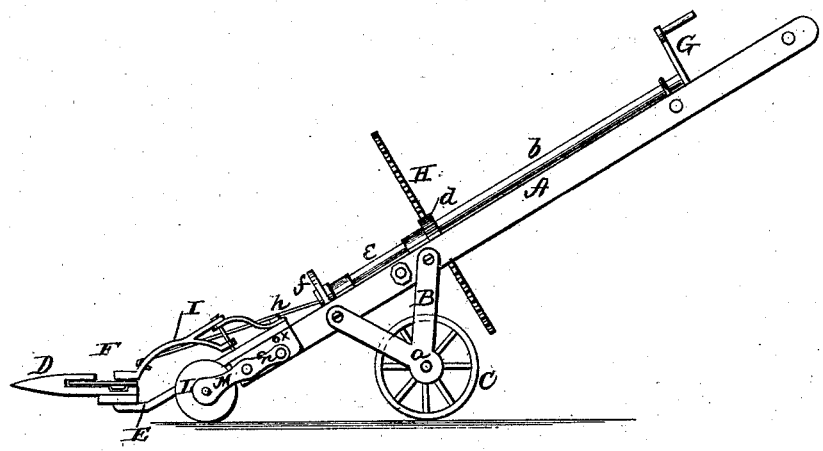
Figure 2:
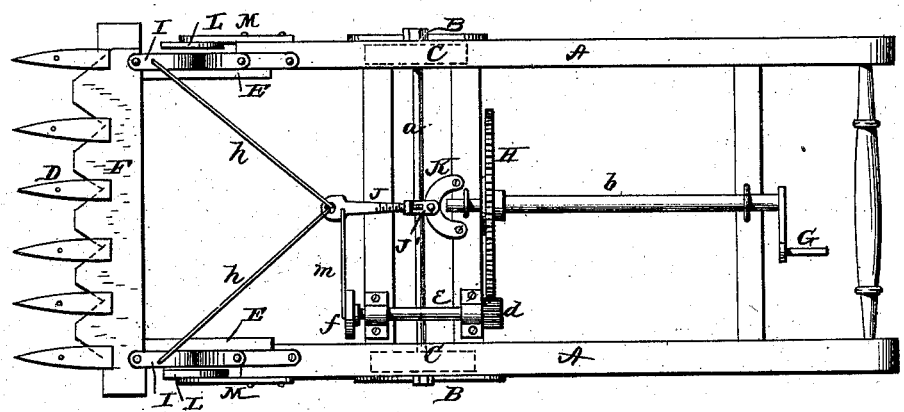
Figure 3:

Figure 1 is a side elevation, and Fig. 2 a plan view, of a lawn-mower embodying my invention. Fig. 3 is a detailed view of the take-up device.

A represents the frame of the lawn-mower, having a hanger, B, attached to each side, in which is placed the axle *a*, with the wheels C C secured thereon. To arms E E, secured on the forward ends of the side bars of the frame A, is attached the finger-bar D, and the cutter-bar or knife F works in said finger-bar, the finger-bar and cutter-bar being similar to those used in other field or lawn mowers.

The gearing or driving mechanism is operated by a hand-crank, G, attached to the rear end of a longitudinal shaft, *b*, which has upon it a gear-wheel, H, that meshes with a pinion, *d*, on a short shaft, *e*. This shaft has upon its forward end a wheel with crank or wrist pin *f*, from which motion is transmitted to the knife F by means of a link attachment, as follows: On each side bar of the frame A, at the forward end, is pivoted a curved bar or arm, I, the other end of which is connected to the knife F.

By reference to Fig. 1 it will be seen that the rear end of each arm I is made double or forked, so as to form two bearings for the pivot that passes through it, thus preventing any wabbling on the pivot.

*h h* are two hooked rods, which are attached to the lower or forward ends of the arms I, while their other ends are connected to the flattened end of a screw-rod, J, which is screwed and adjusted in a link, J', pivoted to a plate, K, in the center of the machine, above or in rear of the cutter-bar, so as to bring the hook-rods *h h* in an oblique or diagonal direction.

*m* is a pitman connecting the crank-pin *f* of the driving mechanism with the lower end of the screw-rod J. By this means a steady and uniform reciprocating motion is given to the cutter-bar or knife.

By means of the take-up screw J the joint between the cutter and finger bars can be kept at all times in perfect working order.

The forward or lower end of the mower is supported upon two small wheels, L L, one on each side of the machine. Each wheel L is mounted at the inner side of an arm, M, which is pivoted to the outer side of the side bar of the frame. This arm extends in rear of its pivot for a suitable distance, and its rear end is held to the frame by a set-screw, *n*, or equivalent means, there being two or more holes, *x*, for such set-screw, so as to change the position of the arm, and thus adjust the wheels L up or down to regulate the height of cut, as desired.

Having thus fully described my invention, what I claim as new, and desire to secure by Letters Patent, is—

In a lawn-mower, the screw-rod J and pivoted link J', in combination with the rods *h h*, curved arms I, knife F, and rod *m*, connecting the screw-rod with the driving mechanism, substantially as and for the purposes herein set forth.

In testimony that I claim the foregoing I have hereunto set my hand this 16th day of July, 1879.

TIMOTHY D. MARSH.

Witnesses:
J. E. RADLEY,
F. K. HOYT.